(12) United States Patent
McCready et al.

(10) Patent No.: US 11,916,911 B2
(45) Date of Patent: Feb. 27, 2024

(54) GATEWAY ENROLLMENT FOR INTERNET OF THINGS DEVICE MANAGEMENT

(71) Applicant: VMware LLC, Palo Alto, CA (US)

(72) Inventors: Glen McCready, Palo Alto, CA (US); Ravishankar Chamarajnager, Atlanta, GA (US); Greg Bollella, Palo Alto, CA (US); Muhammad Akbar, Palo Alto, CA (US); Michael Robert Jones, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 18/097,638

(22) Filed: Jan. 17, 2023

(65) Prior Publication Data

US 2023/0156006 A1 May 18, 2023

Related U.S. Application Data

(63) Continuation of application No. 17/509,285, filed on Oct. 25, 2021, now Pat. No. 11,595,392, which is a continuation of application No. 15/902,321, filed on Feb. 22, 2018, now Pat. No. 11,190,513.

(60) Provisional application No. 62/619,666, filed on Jan. 19, 2018.

(51) Int. Cl.
*H04L 29/06* (2006.01)
*H04L 9/40* (2022.01)
(Continued)

(52) U.S. Cl.
CPC ............ *H04L 63/10* (2013.01); *H04L 9/32* (2013.01); *H04L 63/02* (2013.01); *H04L 63/08* (2013.01); *H04L 63/101* (2013.01); *H04L 63/166* (2013.01); *H04L 41/046* (2013.01); *H04L 41/22* (2013.01); *H04L 41/28* (2013.01); *H04L 67/562* (2022.05)

(58) Field of Classification Search
CPC ...................................... H04L 63/10
See application file for complete search history.

(56) References Cited

U.S. PATENT DOCUMENTS 9,712,486 B2 7/2017 Johnson et al.
10,002,526 B1 6/2018 Dyer et al.
(Continued)

FOREIGN PATENT DOCUMENTS

WO 2018190854 10/2018

*Primary Examiner* — Bradley W Holder
(74) *Attorney, Agent, or Firm* — King Intellectual Asset Management

(57) ABSTRACT

Disclosed are various examples for enrollment of gateway enrollment for Internet-of-Things (IoT) device management. In some examples, a client device receives a gateway management installation package from a management service. The client device installs a gateway management application to the gateway device using the installation package. Enrollment credentials are entered through a user interface generated using the gateway management application and shown on the client device. The client device instructs the gateway management application enroll the gateway device with the management service. Usage of the enrollment credentials prevents a user from being exposed to gateway credentials that authenticate communications between the gateway device and the management service.

20 Claims, 6 Drawing Sheets

(51) Int. Cl.
*H04L 9/32* (2006.01)
*H04L 41/046* (2022.01)
*H04L 41/28* (2022.01)
*H04L 41/22* (2022.01)
*H04L 67/562* (2022.01)

(56) References Cited

U.S. PATENT DOCUMENTS

| | | |
|---|---|---|
| 10,064,062 B2 * | 8/2018 | Idnani .................. H04W 60/00 |
| 10,079,691 B2 | 9/2018 | Christopher et al. |
| 10,095,495 B2 | 10/2018 | Leonelli et al. |
| 10,104,077 B1 * | 10/2018 | Irwan ...................... G06F 21/45 |
| 10,255,067 B2 | 4/2019 | Noens |
| 10,481,925 B2 | 11/2019 | Yang et al. |
| 10,547,731 B2 | 1/2020 | Kim et al. |
| 10,693,795 B2 | 6/2020 | Chen et al. |
| 2016/0128043 A1 * | 5/2016 | Shuman .............. H04W 72/044 |
| | | 370/329 |
| 2016/0274870 A1 | 9/2016 | Seidman |
| 2017/0019853 A1 * | 1/2017 | Ghosh ............... H04W 52/0216 |
| 2017/0180462 A1 | 6/2017 | Leonelli et al. |
| 2018/0054850 A1 | 2/2018 | Leonelli et al. |
| 2018/0213349 A1 | 7/2018 | Panje |
| 2019/0230063 A1 | 7/2019 | McCready et al. |
| 2019/0356556 A1 | 11/2019 | Pascale |

* cited by examiner

GATEWAY ENROLLMENT FOR INTERNET OF THINGS DEVICE MANAGEMENT

CROSS-REFERENCE TO RELATED APPLICATIONS

This application claims priority to and the benefit of the following Applications, and is a continuation of Ser. No. 17/509,285, filed on Oct. 25, 2021 and titled "GATEWAY ENROLLMENT FOR INTERNET OF THINGS DEVICE MANAGEMENT," which is a continuation of U.S. application Ser. No. 15/902,321, filed on Feb. 22, 2018 and titled "GATEWAY ENROLLMENT FOR INTERNET OF THINGS DEVICE MANAGEMENT," which claims priority to U.S. Provisional Application No. 62/619,666, filed on Jan. 19, 2018 and titled "GATEWAY ENROLLMENT FOR INTERNET OF THINGS DEVICE MANAGEMENT," all of which are incorporated by reference herein in their entireties.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data, from theft, data loss, and unauthorized access. In order to access a network, IoT devices can connect through a gateway or another edge device.

Client devices, edge devices, and other devices can be required to authenticate with the management service to ensure secure management communications. For example, a client device such as a cellular phone, a tablet, a computer, or another device can authenticate with the management service using credentials created by or otherwise associated with an end user of the client device. However, a gateway or edge device might not be associated with an end user or their credentials in the manner that a cellular phone, a tablet, or a computer is associated with an end user. One solution might be to allow an administrator to be considered an end user for the gateway, but this solution is problematic. For instance, it can be a security risk for an administrator to create and know the credentials used to authenticate a gateway with the management service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
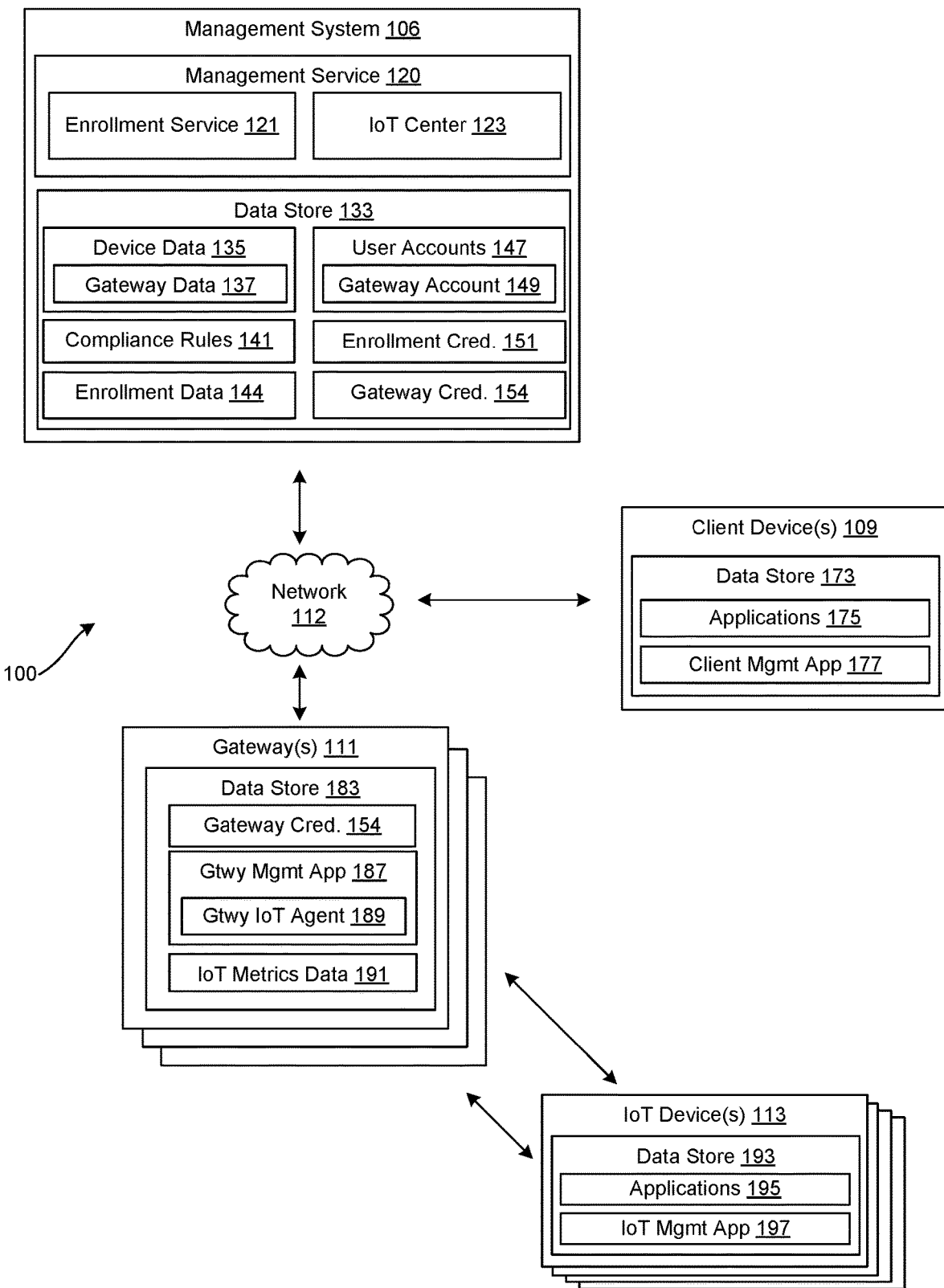
FIG. 1 is a drawing of an example of a networked environment including a management system, a client device, at least one gateway, and at least one Internet-of-Things (IoT) device.

The present disclosure relates to gateway enrollment for Internet-of-Things (IoT) device management. In order to provide data and interact with the physical world, IoT devices can connect to a network through a gateway or another edge device. A management service can enroll and manage the gateway in order to ensure secure interaction with the IoT devices. The gateway can authenticate with the management service using associated credentials for communications between the gateway and the management service. As discussed above, it can be a security risk for an administrator to create and know the credentials used to authenticate the gateway with the management service. However, examples described herein describe a management service that can securely enroll a gateway for IoT device management.

In some examples, enrollment credentials can be generated. The enrollment credentials can permit functionality limited to operations associated with enrollment of a gateway with the management service. The enrollment credentials can be provided to a user for entry through a user interface of an application executed by the gateway. A request to enroll the gateway with the management service can be received from the gateway. The request can include the enrollment credentials. Gateway credentials can be generated for authentication of the gateway with the management service. The request to enroll the gateway with the management service can be received through a connection that is secured based at least in part on a cryptographic protocol. The cryptographic protocol can be Transport Layer Security (TLS) or another cryptographic protocol.

At least one Access Control List (ACL) rule associated with the gateway can also be generated. The gateway credentials can be transmitted to the application executed by the gateway while neither being displayed on a user interface associated with the application or nor being otherwise provided to the user of the application executed by the gateway. In one example, a message or command is transmitted to the application that causes the application to perform one or more functions including: storing the gateway credentials in a particular storage location, encrypting the gateway credentials with a particular encryption protocol or particular key, or otherwise obfuscating the gateway credentials to prevent the user of the gateway from accessing the gateway credentials. The gateway can be authenticated with the management service using the gateway credentials.

Further, an activation schedule for an IoT device can be generated. A command to enroll the IoT device with the management service can be placed in a command queue associated with the gateway, where the gateway can retrieve and implement the command. A message or command to enroll the at least one IoT device can be received by the IoT device from the gateway. An enrollment response associated with the at least one IoT device can be transmitted from the IoT device to the gateway.

IoT metrics data associated with an IoT device can be received from the gateway. An installation package that includes the application can be generated. The installation package can be generated or encoded to be executable by the gateway or a particular type of the gateway.

With reference to FIG. 1, shown is an example of a networked environment 100. The networked environment 100 can include a management system 106, a client device 109, and a gateway 111 in communication with one another over a network 112. Internet-of-Things (IoT) devices 113 connect to the network 112 through the gateway 111. The components of the networked environment 100 can be utilized to enroll the gateway 111 with the management service 120 and securely obtain gateway credentials 154 to authenticate with the management service 120. The gateway 111 can communicate with the management service 120 for management of the IoT devices 113 that connect to the network 112 through the gateway 111.

An administrator, technician, or other user can be provided with enrollment credentials 151 that are limited to enrollment operations. The user can manually enter the enrollment credentials 151 during an enrollment process, and the management service 120 can generate and provide gateway credentials 154 to authenticate the gateway 111 with the management service 120. The gateway credentials 154 are not provided to or rendered on a display for viewing by the user. In some situations, the gateway credentials 154 are known only by the management service 120 and the gateway 111. In this way, the gateway 111 can be enrolled with the management service 120 without a user being exposed to the gateway credentials 154. The IoT devices 113 can be enrolled with the management service 120. The gateway 111 can perform enrollment and validation functions associated with the IoT devices 113.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120, an enrollment service 121, an IoT Center 123, as well as other applications, services, processes, systems, engines, or functionality not discussed in detail herein. The enrollment service 121 and the IoT Center 123 can each be considered a module, component, or process of the management service 120 and can each be executed on the same computing device or can each be executed on a different computing device. The management service, the enrollment service 121 and the IoT Center 123 can each be stored in the data store 133 of the management system 106. While referred to generally as the management service 120 herein, the various functionalities and operations discussed can be provided by the management service 120 or any of its components, including the enrollment service 121 and the IoT Center 123.

The data store 133 can include any storage device or medium that can contain, store, or maintain the instructions, logic, or applications described herein for use by or in connection with the instruction execution system. The data store 133 can be a hard drive or disk of a host, server computer or any other system providing storage capability. While referred to in the singular, the data store 133 can include a plurality of storage devices that are arranged in one or more hosts, server banks, computer banks, or other arrangements. The data store 133 can include any one of many physical media, such as magnetic, optical, or semiconductor media. More specific examples include solid-state drives or flash memory.

The data store 133 can include memory of the management system 106, mass storage resources of the management system 106, or any other storage resources on which data can be stored by the management system 106. The data stored in the data store 133 can include, for example, management data including device data 135, enterprise data 138, compliance rules 141, and enrollment data 144, as well as other data.

The data stored in the data store 133 can be associated with the operation of the various applications and/or functional entities described. Client devices 109, gateways 111, and IoT devices 113 can be identified within the device data 135 by one or more of a device identifier, a unique device identifier (UDID), a media access control (MAC) address, an internet protocol (IP) address, or another identifier that uniquely identifies a device with respect to other devices. The device data 135 can include gateway data 137 associated with gateways 111 and other edge systems or edge devices through which IoT devices 113 can connect to the network 112. The gateway data 137 can also include specifications and for each gateway 111, a type of gateway for each gateway 111, a device identifier for each gateway 111, and other information. Specifications for the gateway 111 can include hardware configurations including a chipset utilized by the gateway, a performance or capacity of the gateway 111, and software configurations including a version of the gateway management application 187 installed, a model identifier of the gateway 111, and other information.

Device data 135 can include data associated with a configuration of each client device 109, gateway 111, and IoT device 113, and can include an identifier of the client device 109, gateway 111, or IoT device 113. The identifier can be a serial number, media access control (MAC) address, other network address, or another device identifier. In addition, the device data 135 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data 138 while a client device 109, gateway 111, or IoT device 113 designated as "not enrolled," or having no designation, can be denied access to the enterprise data 138.

Additionally, device data 135 can include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts 147 or service accounts associated with each of the devices, the physical locations of each of the devices, the network to which each of the devices is connected, and other information describing the current state of each of the devices. While a user account 147 can be associated with a particular person, in some cases a user account can be unassociated with any particular person, and can nevertheless be utilized for client devices 109, gateways 111, or IoT devices 113 that provide certain functionalities, such as automatic functionalities. For example, a gateway 111 can be associated with a service account or a gateway account 149 that is unassociated with any person.

Device data 135 can also include data pertaining to user groups. An administrator can specify one or more of the client devices 109, gateways 111, and IoT devices 113 as belonging to a user group. The user group can refer to a group of user accounts 147, which can include gateway accounts 149. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department.

Compliance rules 141 can include, for example, configurable criteria that must be satisfied for an enrolled one of the client devices 109, gateways 111, and IoT devices 113 to be "in compliance" with the management service 120. The compliance rules 141 can be based on a number of factors including geographical location, activation status, enrollment status, authentication data including authentication data obtained by a device registration system, time, and date, and network properties, among other factors associated with each device. The compliance rules can also be determined based on a user account associated with a user. In some cases, a gateway 111 can be unassociated with a user, but can nevertheless be associated with a service account, a gateway account 149, or another user account 147 that is unassociated with a user.

The user profile can be identified by obtaining authentication data associated with the client device 109. The user profile can be associated with compliance rules that are further determined based on time, date, geographical location and network properties detected by the client device 109. The user profile can further be associated with a user group, and compliance rules 141 can be determined in view of the user group.

Compliance rules 141 can include predefined constraints that must be met in order for the management service 120, or other applications, to permit access to the enterprise data 138 or other features of the client device 109. The management service 120 can communicate with a management application or another application executable on the client devices 109, gateways 111, and IoT devices 113 to determine whether states exist that do not satisfy one or more compliance rules 141. Some of these states can include, for example, a virus or malware being detected on the device; installation or execution of a blacklisted application; a device being "rooted" or "jailbroken," where root access is provided to a user of the device. Additional states can include the presence of particular files, questionable device configurations, vulnerable versions of client applications, or other vulnerability, as can be appreciated. The management service 120 can communicate with the gateway management application 187 to determine whether states exist that do not satisfy one or more compliance rules 141 regarding the IoT devices 113. The gateway management application 187 can receive IoT device 113 communications, for example from the IoT management application 197. The IoT device 113 communications can include status data for the IoT device 113. The gateway management application 187 can pass or otherwise transmit the status data to the management service 120 for evaluation of the compliance rules 141. The management service 120 can also transmit all or a portion of the compliance rules 141 to the gateway 111. The gateway 111 can store the compliance rules 141 in the data store 183. The gateway 111 can then determine or evaluate whether states exist, for example on the IoT devices 113, that do not satisfy one or more compliance rules 141, for example, without passing or transmitting the status data to the management service 120. In any case, determining that states exist in the IoT device 113 that do not satisfy one or more compliance rules 141 can trigger an action or command that causes the IoT device 113 to be in compliance with the compliance rules 141. In some examples, the compliance rules 141 include one or more commands that bring the IoT device 113 into compliance.

Enrollment data 144 can include information that can be used to enroll a client device 109, gateway 111, or IoT device 113 with the management service 120. Enrollment data 144 can also include a network address or other information to facilitate communication between the device and the management service 120. Further, the enrollment data 144 can include an enrollment link, or a link to a network location or endpoint of the management service 120 that allows the gateway 111 to enroll with the management service 120. Enrollment data 144 can also include a network resource address and other instructions for communications with the management service 120, for example, to utilize an API of the management service 120. To this end, the management service 120 can include the network site and generate a link to the network location to include in the enrollment data 144.

The enrollment data 144 can include an enrollment token such as a value, parameter, or file that can be used to authenticate the client device 109, gateway 111, or IoT device 113 with the management service 120. An enrollment token can be included in a link for enrollment. In some cases, the management service 120 can distribute enrollment tokens corresponding to each of the client devices 109, gateways 111, IoT device 113, and/or users. To this end, a request for an enrollment token can be required to include a device identifier, username, password, or other information. While the enrollment token can be used to enroll the client device 109, in some cases it can be requested from another device, such as the management system 106. An enrollment token can be valid during a certain time period after which the enrollment token can expire. The enrollment data 144 can be considered part of the compliance rules 141 and can be determined based on device identifier, time, date, geographical location and network properties like the compliance rules 141.

Enrollment credentials 151 can be generated by the management service 120, for example, by the enrollment service 121 or the IoT center 123. The enrollment credentials 151 can then be provided to an administrator, technician, or another user for enrollment operations. In one example, the management service 120 can transmit the enrollment credentials 151 to a particular user using one or more electronic methods including: SMS, MIMS, email, instant messenger application, or message board application. In another example, the management service 120 can provide a particular user with access to the enrollment credentials 151 by causing a physical shipment including a physical copy of the enrollment credentials 151 to be delivered to a physical address associated with the particular user.

The enrollment credentials 151 can be limited to operations associated with enrollment of the gateway 111 with the management service 120. The enrollment credentials 151 can be limited by an ACL rule associated with the gateway account 149 when using the enrollment credentials 151. Alternatively or additionally, enrollment credentials 151 can be limited by only enabling the enrollment credentials 151 to authenticate with an enrollment endpoint of the management service 120. The enrollment credentials 151 can, for example, permit access to the enrollment service 121 while not permitting access to IoT Center 123 or other aspects or functionalities of the management service 120.

In some situations, the enrollment credentials 151 can be credentials associated with an existing gateway account 149, but are limited to permitting enrollment operations, such as generating gateway credentials 154 for the gateway account 149. The enrollment credentials 151 can, for example, be used only for generating gateway credentials 154 and do not permit communication with the IoT Center 123 or otherwise with the management service 120.

In other situations, the enrollment credentials 151 are not associated with an existing gateway account 149, and can be used during the enrollment process to create a new gateway account 149 for the gateway 111. The enrollment credentials 151 can be utilized to connect to or authenticate with an enrollment endpoint provided by the enrollment service 121 for enrollment. The enrollment credentials 151 can be provided to the gateway management application 187 during installation of the gateway management application 187 or once the gateway management application 187 is installed on the gateway appliance. In one example, a user of the gateway can input the enrollment credentials 151 into a user interface element of the gateway management application 187. In another example, an electronic file or token including the enrollment credentials 151 can be made accessible to the gateway management application 187 and the gateway management application 187 can obtain the enrollment credentials 151 from the electronic file or token. The enrollment credentials 151 can permit enrollment operations including initial creation of the gateway account 149 and enrollment of the gateway 111, while not permitting subsequent authentication of the gateway 111 with the management service 120 or the IoT center 123 for IoT management and communications.

Gateway credentials 154 can be credentials associated with the gateway account 149, and can enable or permit communications with the IoT Center 123 of the management service 120. The gateway credentials 154 are provided to the gateway 111 for authentication with the management service 120 and the IoT Center 123 for management and IoT operations. In some situations, the gateway credentials 154 are not provided to or exposed to any user during the enrollment process. The gateway credentials 154 can include one or more of a username, a password, or an enrollment token for authentication. In some examples, the gateway credentials 154 can include a hash message authentication code (HMAC) token.

The management service 120 can oversee the management of devices including the client devices 109 and gateways 111. The management service 120 can oversee the operation of the devices enrolled with the management service 120 as well as manage enrollment and un-enrollment operations for the devices, for example, using the enrollment service 121. The management service 120 can provide functionality using application program interfaces (APIs). To this end, an API of the management service 120 can provide enrollment information regarding a device, such as whether the device is enrolled with the management service 120. APIs or API calls can be provided for other functionalities of the new management service 120 as discussed herein.

In some embodiments, an enterprise, such as one or more companies or other organizations, can operate the management service 120 to oversee or manage the operation of the client devices 109 of its employees, contractors, customers, students, or other users having user accounts with the enterprise. The enterprise can also operate the management service 120 to oversee or manage the operation of the gateways 111 associated with the enterprise, as well as devices that connect to the network 112 through the gateways 111, including IoT devices 113. An enterprise can be any customer of the management service 120. The management service 120 can remotely configure the client device 109 by interacting with an agent application, a management application 177 or another application 175 executed on the client device 109. Likewise, the management service 120 can remotely configure the gateway 111 by interacting with an agent application, a gateway management application 187, or another application executed on the gateway 111. The gateway management application 187 can include a number of components including an IoT Agent 189 for management and communication with IoT devices 113.

The management service 120 can transmit various software components to the gateway 111 which are then installed, configured, or implemented by the gateway management application 187. Such software components can include, for example, additional client applications, resources, libraries, drivers, device configurations, or other similar components that require installation on the gateway 111 as specified by the enterprise or an administrator of the management service 120. The management service 120 can further cause policies to be implemented on a gateway 111. Policies can include, for example, restrictions or permissions pertaining to capabilities of a gateway 111. For instance, policies can require certain hardware or software functions of the gateway 111 to be enabled or be disabled during a certain time period or based on a particular location. Such policies can be implemented by the gateway management application 187. The management service 120 can also cause the gateway 111 to activate or enroll IoT devices 113, for example, by placing at least one command associated with an activation schedule for one or more of the IoT devices in a command queue of the gateway 111. The gateway 111 can check in with the management service 120, retrieve the command from the command queue provided by the management service 120, and implement the command using the gateway management application 187.

Likewise, the management service 120 can transmit various software components to the client device 109 which are then installed, configured, or implemented by the management application 177. Such software components can include, for example, additional applications 175, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the management application 177.

The management service 120 can also transmit various software components to the IoT device 113 which are then installed, configured, or implemented by the IoT management application 197. Such software components can include, for example, additional applications 195, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location. Such policies can be implemented by the IoT management application 197. The management service 120 can transmit the software components to the IoT device 113 through the gateway 111. The management service 120 can have a command queue storing at least one action to perform on the particular gateway 111 upon check-in of the gateway 111. For instance, the gateway management application 187 can cause the gateway 111 to check-in with the management service 120, identify an action in the command queue, and perform or implement the action. An action can be the installation of a profile, or the execution of a command or other actions to install software components, implement policies, update the gateway management application 187, install a software product, or implement other commands. In some cases, the gateway management application 187 can cause a check-in of the gateway 111 periodically, on a schedule, or upon an event, such as changing a state of the gateway 111, installing an application on the gateway 111, upon detecting an IoT device 113, or upon receiving a request to access the network 112 or another request from an IoT device 113. In one example, the contents of the command queue can include a command that the gateway management application 187 causes to be executed on the gateway 111. In another example, the contents of the command queue can include a resource, an application, or an application update that the gateway management application 187 causes to be installed on the gateway 111, which the gateway may access through a specified uniform resource locator (URL) in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management application 187 can cause the gateway 111 to check-in with the management service 120. The gateway management application 187 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The enrollment service 121 can oversee the enrollment of gateway 111 with the management service 120. In some instances, the enrollment service 121 can include a web application that can be accessed by the client device 109 through the network 112 to perform functionality related to secure enrollment of gateway 111 and secure delivery of credentials to the gateway 111. The enrollment service 121 instructions for other functionality can be stored in a data store 133 of the management system 106. The data store 133 can include memory of the management system 106, mass storage resources of the management system 106, or any other storage resources on which data can be stored by the management system 106.

The enrollment service 121 can provide operations associated with enrollment of the gateway 111 with the management service 120. For example, the enrollment service 121 can provide an endpoint such as an API, network site, or network location for enrollment of the gateway 111 with the management service 120. The enrollment service 121 can receive a request to enroll the gateway 111 that includes enrollment credentials 151. The enrollment service 121 can then perform enrollment operations. In the various examples, the enrollment operations can include one or more of creating a gateway account 149 associated with the gateway 111, generating gateway credentials 154 for authentication of the gateway 111 with the management service 120 for IoT device 113 management, associating the gateway credentials 154 with multiple accounts and functionalities of the management service 120, setting or changing ACL rules associated with the gateway account 149, and securely transmitting the gateway credentials 154 to the gateway 111.

The IoT Center 123 can oversee management of gateways 111, routers, routing switches, integrated access devices (IADs), multiplexers, and a variety of metropolitan area network (MAN) and wide area network (WAN) access devices, and other edge devices. The IoT Center 123 can also oversee management of IoT devices 113 that are connected through the edge devices. The IoT Center 123 can generate and provide an administrative console or user interface for management of the gateway 111, other edge devices, and IoT devices 113 that are connected through the edge devices. The user interface of the IoT Center 123 can be accessed through a management application 177 or another application 175 of a client device 109, or can be accessed through a network site provided by the IoT center 123 or the management service 120. The IoT center 123 can provide a user interface for setting and viewing alerts and notifications. The alerts and notifications can also be sent to a particular email address or to a particular client device 109.

The IoT center 123 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol. The IoT center 123 can also include an analytics service that provides real-time infrastructure analytics for the gateway 111, other edge devices, and IoT devices 113. The analytics can be generated based on IoT metrics data 191 provided from the gateway 111 or other edge devices. The gateway 111 can provide IoT metrics data 191 based on IoT device 113 communications with the gateway 111. The IoT Center 123 can also provide or utilize the command queue and notification services as discussed above regarding the management service 120, for instance, to in order to provide over-the-air software and policy updates for the gateway 111, other edge devices, and IoT devices 113.

The IoT metrics data 191 can include a stream of at least one tuple comprising a number and a time stamp. The IoT metrics data 191 can include a sampling function which is a user defined method (udm), a sampling frequency stating the interval between subsequent executions of the udm and an aggregation count stating how many executions of the udm to aggregate before sending the IoT metrics data 191, for example, to the management service 120 or IoT center 123. The IoT metrics data 191 can include SI units and a prefix that identifies what the numbers of the stream of IoT metrics data 191 represent. A user interface can be generated based at least in part on the IoT metrics data 191.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 173 that also includes applications 175, a management application 177, and other data. The client device 109 can execute the management application 177 to perform or access the functionality described for the management system 106, including the management service 120, the enrollment service 121, and the IoT center 123.

In one example, the client device 109 can be or include the gateway 111 itself. For instance, the client device 109 can comprise the gateway 111 and a display device coupled to the gateway 111 through which user interfaces rendered by the gateway 111 can be viewed and utilized by a user. In such case, the management application 177 can be or include the gateway management application 187. In another example, the client device 109 can be a different computing device from the gateway 111 and can be used to instruct the gateway 111 to perform certain functionality. In this case, the management application 177 can be a different application than the gateway management application 187, and the management application 177 can cause the gateway management application 187 to perform certain functionality by transmitting appropriate instructions over the network 112. Further, in such case, the management application 177 can be a native application, or the management application 177 can be a browser application configured to provide access to a web-based service which may be hosted or made accessible by the gateway management application 187.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 175, such as a management application 177, a browser application, or another application. The operating system and some applications 175 can access network content served up by the management system 106, or other servers, thereby rendering a user interface on a display, such as a liquid crystal display (LCD), organic light emitting diode (OLED) display, touch-screen display, or other type of display device.

To this end, some applications 175 can include a browser or a dedicated application, and a user interface can include a network page, an application screen, or other interface. The client device 109 can also access web applications using the browser application. Further, other applications 175 can include device management applications, enterprise applications, social networking applications, word processors, spreadsheet applications, media player applications, or other applications. The management application 177 can be an application that performs certain functions in the enrollment of the gateway 111 with the management service 120. The management application 177 can perform actions as directed by the management service 120, for instance, by checking in with the management service 120, retrieving a command from the command queue, and implementing the command as discussed above.

The gateway 111 can be representative of one or more gateways 111. While referred to as a gateway, the gateway 111 can also be representative of routing switches, integrated access devices (IADs), multiplexers, and a variety of metropolitan area network (MAN) and wide area network (WAN) access devices, and other edge devices. The gateway 111 can perform functionalities and execute applications stored in a data store 183. For example, the gateway 111 can execute a gateway management application 187 and other applications. The gateway management application 187 can include an IoT agent 189 for management and communication with IoT devices 113. The gateway management application 187 can perform the functionality described for the management system 106, including the management service 120, the enrollment service 121, and the IoT center 123, for instance, by checking in, retrieving a command from the command queue, and implementing the command as discussed above. The gateway 111 can provide network 112 access to the IoT devices 113, as well as implement enrollment processes and gathering IoT metrics data 191 based on IoT device 113 communications with the gateway 111.

In one example, the gateway management application 187 can generate a user interface that allows a user such as an administrator or a technician to provide the gateway management application 187 with enrollment credentials 151. The enrollment credentials 151 can be entered while installing a side load package or another installation package of the gateway management application 187 or once installed. The gateway management application 187 can generate a prompt in a user interface through which a username, password, or other enrollment credentials can be received or input. The gateway management application 187 can indicate progress or provide notifications related to installation and enrollment through a user interface. In some cases, the user interface can be transmitted or provided to a client device 109 through the network 112, such that a user of the client device 109 can provide the gateway management application 187 with the enrollment credentials 151 using the client device 109. In another example, the user can provide the gateway management application 187 with access to the enrollment credentials 151 by providing the gateway management application 187 with access to an electronic file or token including a copy of the enrollment credentials 151. In such example, the user can utilize a user interface of the gateway management application 187 rendered by either of the gateway 111 or a client device 109 to provide the gateway management application 187 with access to an electronic file or token including a copy of the enrollment credentials 151.

In some examples, gateway management application 187 can identify a device identifier of the gateway 111 when needed for the enrollment process. The gateway management application 187 can search information in the data store 183 to identify system information associated with the gateway 111 that can be used to identify the device identifier of the gateway 111. For example, the gateway management application 187 can search the data store 183 and identify a serial number or other device identifier of the gateway 111.

Once the enrollment process is complete, the gateway management application 187 can indicate completion of the enrollment process, and other status information related to installation and enrollment. The gateway management application 187 can also enable features or functionalities of the now enrolled gateway 111. For example, the gateway management application 187 can enable a network adapter such as a WiFi adapter or 802.11 device to facilitate identifying a MAC address associated with the gateway 111. In some examples, a MAC address of the gateway 111 might be unavailable unless the network adapter has been enabled. In such a scenario, the gateway management application 187 can cause the client device 109 to enable the network adapter and identify a MAC address, IP address, or other device identifier. The gateway management application 187 can store data such as the IoT metrics data 191 on the data store 183. In some instances, the gateway management application 187 can obtain or receive communications from the IoT devices 113, and can generate or aggregate the IoT metrics data 191 using the IoT device 113 communications. The gateway management application 187 can also cause the IoT device 113 to install an IoT management application 197.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can have an operating system or other software that can perform functionalities and execute applications. The operating system can be stored in a data store 193 that also includes applications 195, an IoT management application 197, and other data. The IoT device 113 can execute the IoT management application 197 to perform or access the functionality described for the management system 106, including the management service 120, the enrollment service 121, and the IoT center 123.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

Figure 2:
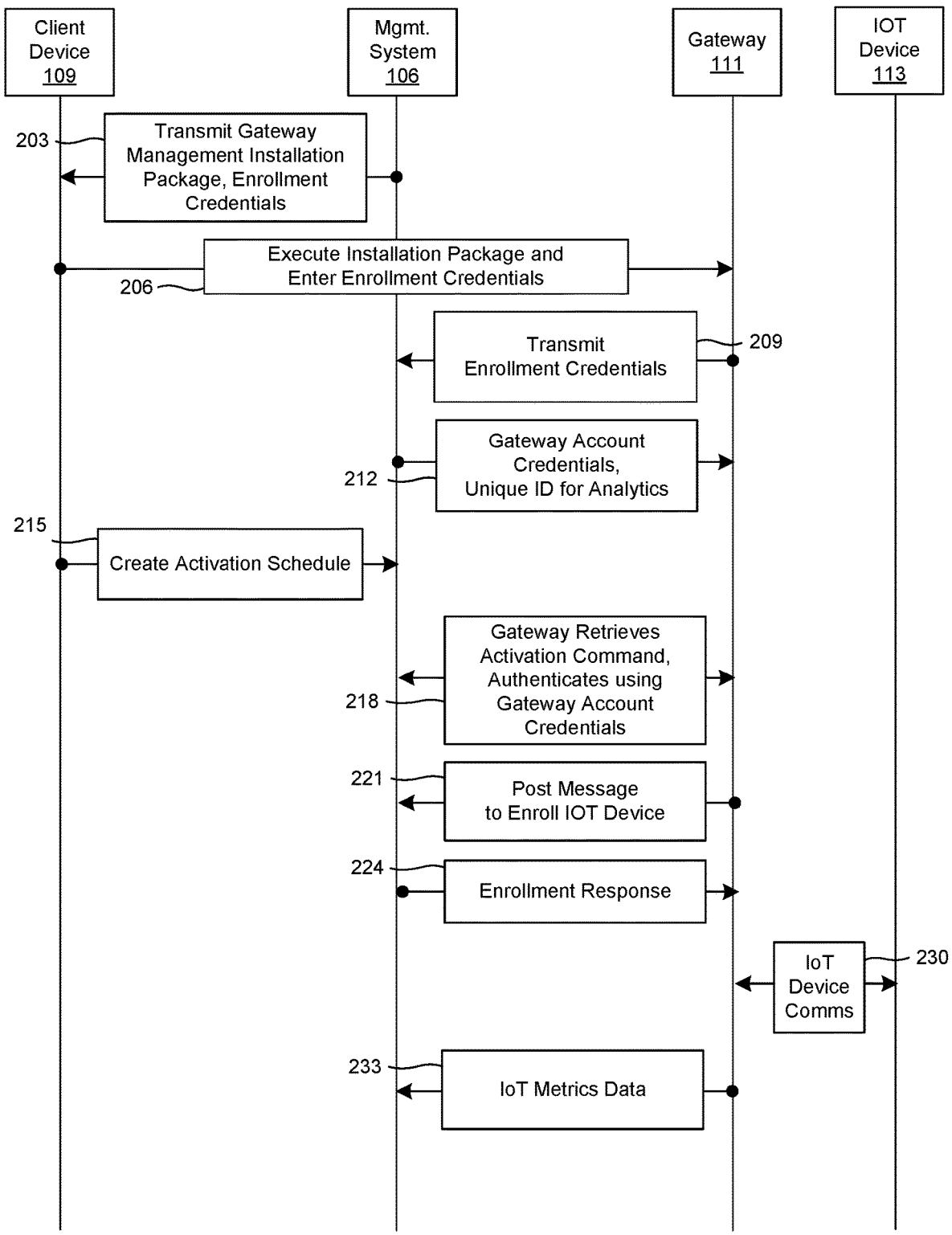
FIG. 2 is a sequence diagram illustrating functionality implemented by components of the networked environment.

The IoT management application 197 can perform actions as directed by the management service 120 and/or the gateway 111. The gateway management application 187 and/or the management service 120 can maintain a command queue for the IoT device 113. The command queue for the IoT device 113 can include actions and commands as discussed. The gateway management application 187 can determine whether states exist on the IoT device 113 that violate one or more of the compliance rules 141 based on status data received from the IoT device 113, or pass status data received from the IoT device 113 to the management service 120 to perform the evaluation. If the IoT device 113 is not in compliance, the gateway management application 187 or the management service 120 can place a command to bring the IoT device 113 into compliance in a command queue for the IoT device 113. The IoT management application 197 can retrieve the command to bring the IoT device 113 into compliance. The IoT management application 197 can implement the command. The management service 120 can place a command for the IoT device 113 in the command queue for the gateway 111. The gateway management application 187 can retrieve the command, and place it in a command queue for the IoT device 113 that is maintained on the gateway 111. FIG. 2 shows a sequence diagram that illustrates steps performed by components of the networked environment 100. Generally, this enables the gateway 111 to enroll with the management service 120 and securely obtain gateway credentials 154 to authenticate with the management service 120. The gateway 111 can then communicate with the management service 120 for management of the IoT devices 113 that connect to the network 112 through the gateway 111. As described above, in some examples, a client device 109 can comprise or otherwise include the gateway 111. For example, the gateway 111 can include a display and functionalities discussed with reference to the client device 109. Accordingly, with reference to FIG. 2, the steps performed by the client device 109 can also or alternatively be performed by the gateway 111.

Starting with step 203, management system 106 can transmit the gateway management application 187 to the client device 109 (or gateway 111). The gateway management application 187 can be transmitted in the form of an installation package or side load package for the gateway management application 187. The client device 109 (or gateway 111) can be associated with an administrator or a technician or another user that will facilitate installation of the gateway management application 187 on the gateway 111 and enrollment of the gateway 111 with the management service 120. In some cases, a particular URL is provided to the client device 109 (or gateway 111), or otherwise to the administrator, technician, or other user, to download an installation package of the gateway management application 187. In some cases, the gateway management application 187 can be generated for a particular type of the gateway 111, for example, to provide particular functionalities for a particular type of gateway 111, or to allow execution by the particular type of gateway 111. The particular type of the gateway 111 can be specified as a model of the gateway 111, or an existing software configuration, or a hardware configuration of the gateway 111. The gateway management application 187 can be generated for a particular user group associated with, or to be associated with, the gateway 111.

The enrollment credentials 151 can also be transmitted to the client device 109 (or gateway 111) or otherwise be provided to the user that facilitates installation of the gateway management application 187 on the gateway 111. For instance, the enrollment credentials 151 can be transmitted to the management application 177 or another application 175 such as a secure content locker application on the client device 109. The enrollment credentials 151 can also be emailed to a particular email address associated with the user. The management service 120 or its components can also provide a user interface that includes the enrollment credentials 151. The user interface can be securely accessed through a network site provided by the management service 120 using a browser application or another application 175 executed by the client device 109 (or gateway 111). An administrator can receive the enrollment credentials 151 and hand them over to a technician with relatively few security concerns, as the enrollment credentials 151 can be limited to operations associated with enrollment of the gateway 111 with the management service 120.

In one example, the client device 109 can transmit a request to the management service 120 for access to the enrollment credentials 151. The management service 120 can transmit the enrollment credentials 151 to the client device 109 (or gateway 111) in response to the request. In some situations, the management service 120 can also create a gateway account 149 for the gateway 111 once the enrollment credentials 151 are received. In these situations, the request for enrollment credentials 151 can also be considered a request to create a gateway account 149. Alternatively, the gateway account 149 can be created at another time, such as in response to a request to enroll the gateway 111 that is transmitted from the gateway management application 187 executed on the gateway 111.

In step 206, the gateway 111 can execute the gateway management application 187. An administrator, technician, or another user can log in or otherwise access the gateway 111 to cause the gateway management application 187 to be provided to and installed on the gateway 111. The gateway management application 187 can be installed using a side load package or another installation package. The installation package can be transmitted to the gateway locally or remotely by the client device 109, the management service 120, or by providing a particular URL for download and installation of the gateway management application 187 from the management service 120.

The gateway management application 187 can generate a user interface element through which the enrollment credentials 151 can be manually entered by a user. In some instances, the gateway management application 187 does not store the enrollment credentials 151 in the data store 173. For example, the gateway management application 187 can allow the entry of the enrollment credentials 151 and transmission to the management service 120, and can discard the enrollment credentials 151 thereafter.

In step 209, the gateway 111 can transmit the enrollment credentials 151 to the management system 106. The gateway management application 187 executed on the gateway 111 can establish a secure connection with the management service 120 executed by the management system 106. The gateway management application 187 can transmit the enrollment credentials 151 to the management service 120 using the secure connection. The secure connection can be secured using a cryptographic protocol. The cryptographic protocol can be Transport Layer Security (TLS) or another cryptographic protocol.

The gateway management application 187 can transmit a request to the management service 120 that includes the enrollment credentials 151. The request can be transmitted to an enrollment endpoint of the management service 120. The request can be considered a request to enroll the gateway 111 with the management service 120. The management service 120 can generate gateway credentials 154 and transmit them to the gateway 111 based on the request. The management service 120 can also enroll the gateway 111 with the management service 120 in association with a gateway account 149. In some situations, the management service 120 can also create the gateway account 149 based on the request. In other situations, the gateway account 149 can be an existing gateway account.

The management service 120 can create the gateway credentials 154 for multiple components of the management service 120, and can set ACL rules that are associated with the gateway 111 and the gateway credentials 154. The ACL rule can include specific authorized or permitted topics which can, for example, be formatted as "Liota$USERID_topic1 and topic2." The ACL rule can permit requests to be posted only to the topics included in the ACL rule (e.g., topics named topic1 and topic2). Existing ACL rules associated with the gateway 111 or the enrollment credentials 151 can be changed and the enrollment credentials 151 can be invalidated or changed to the gateway credentials 154, for example, where the gateway account 149 is an existing account.

The management service 120 can also identify or assign a unique identifier to the gateway 111. The unique identifier can be provided by a component of the management service 120 that generates analytics, operations statistics, and predictions for monitoring, troubleshooting, cost planning, and configuration of systems managed by the management service 120. The management service 120 can assign and transmit the unique identifier to the gateway management application 187 in response to an initial request that includes the enrollment credentials 151. The gateway management application 187 can transmit a request to enroll the gateway 111 with the management service 120. The request to enroll can include an HTTP post to enroll with the management service 120. The request to enroll can include the unique identifier that was returned in response to the initial request.

In step 212, the management system 106 can transmit the gateway credentials 154 to the gateway 111. For instance, the management service 120 executed by the management system 106 can transmit the gateway credentials 154 to the gateway management application 187 executed by the gateway 111. The gateway management application 187 can automatically use the gateway credentials 154 for authentication with the management service 120, without being entered or known by a user. The unique identifier can also be transmitted to the gateway 111. While the administrator, technician, or other user was provided with the enrollment credentials 151 for enrollment of the gateway 111, the gateway credentials 154 are not provided to such user during the enrollment process, and are not shown or displayed by the gateway management application 187. In some examples, no user is provided with the gateway credentials 154, and they are known only by the management service 120 and the gateway management application 187.

In step 215, the client device 109 (or gateway 111) can create an activation schedule to enroll IoT devices 113. An administrator can initiate or facilitate the creation of the activation schedule through a user interface provided by the management service 120 and accessed through a browser application, the management application 177, or another application 175 of the client device 109 (or gateway 111). Creating the activation schedule can include generating an activation command that causes one or more IoT devices 113 to be registered or enrolled with the management service 120.

In some cases, validation of the IoT devices 113 is performed by the gateway 111 on behalf of the management service 120. The validation can be performed by checking for a device type and device name associated with each IoT device 113. To this end, once the activation schedule is created, the activation command to enroll an IoT device 113 can be placed in a command queue associated with the gateway 111. The activation command can include a configuration file that can be applied or executed by the gateway 111 to enroll the IoT devices 113. The activation command can include a source URL for the configuration file and a destination where the configuration file should be stored by the gateway 111.

In step 218, the gateway 111 can retrieve the activation command from the command queue. The gateway management application 187 can check in with the management service 120, retrieve the activation command, and download the configuration file at the specified URL. The gateway credentials 154 can be utilized for authentication with the management service 120 before authorizing the download.

In step 221, the gateway 111 can transmit a request to enroll the IoT device 113 with the management service 120. This can include a post message transmitted by the gateway management application 187 to the message broker or another component of the management service 120.

In step 224, management service 120 can transmit an enrollment response for the IoT device 113 to the gateway 111. The gateway 111 can receive the enrollment response from the management service 120. The enrollment response can include enrollment data that indicates that the IoT device 113 is enrolled with the management service 120. The gateway 111 can write a file that includes enrollment data for the IoT device 113 in the data store 173. This can allow the gateway 111 to perform validation of the IoT device 113. During enrollment of the IoT device 113, the gateway management application 187 can cause an IoT management application 197 to be installed on the IoT device 113. The IoT management application 197 can perform actions as directed by the management service 120 and/or the gateway 111. For instance, a command to install a configuration profile to enroll the IoT device 113 can be placed in a command queue for the IoT device 113. The IoT management application 197 can retrieve the command and install the configuration profile to enroll the IoT device 113.

The IoT management application 197 can perform actions as directed by the management service 120. The management service 120 can maintain a command queue for the IoT device 113. Status data for the IoT device 113 can be identified by the IoT management application 197 or by IoT device 113 communications with the gateway 111. The status data can be used to determine whether states exist on the IoT device 113 that violate one or more of the compliance rules 141 based on status data received from the IoT device 113. If the IoT device 113 is not in compliance, the management service 120 can place a command to bring the IoT device 113 into compliance in a command queue for the IoT device 113 that is maintained by the gateway management application 187 or the management service 120. The IoT management application 197 can retrieve the command to bring the IoT device 113 into compliance. The IoT management application 197 can implement the command. In some examples, the management service 120 can place a command for the IoT device 113 in the command queue for the gateway 111. The gateway management application 187 can retrieve the command, and place it in a command queue for the IoT device 113 that is maintained on the gateway 111.

In step 230, the gateway 111 can receive IoT device 113 communications. The gateway 111 can identify a device type and a device name, and can validate the IoT device 113 and communications by checking for a device type and device name associated with the IoT device 113 within the enrollment data stored in the data store 173.

In step 233, the gateway 111 can transmit IoT metrics data 191 to the management service 120. The IoT metrics data 191 can be generated based on the IoT device 113 communications and can include a stream of at least one tuple comprising a number and a time stamp. The IoT metrics data 191 can include a sampling function which is a user defined method (udm), a sampling frequency utilized by the gateway 111 to determine when to send the IoT metrics data 191. For example, IoT metrics data 191 can specify an interval between subsequent executions of the udm and an aggregation count stating how many executions of the udm to aggregate before sending the IoT metrics data 191 to the management service 120 or IoT center 123. The IoT metrics data 191 can include SI units and a prefix that identifies what the numbers of the stream of IoT metrics data 191 represent. In some cases, the IoT device 113 communications and the IoT metrics data 191 can identify a device type and device name associated with the IoT device 113.

Figure 3:
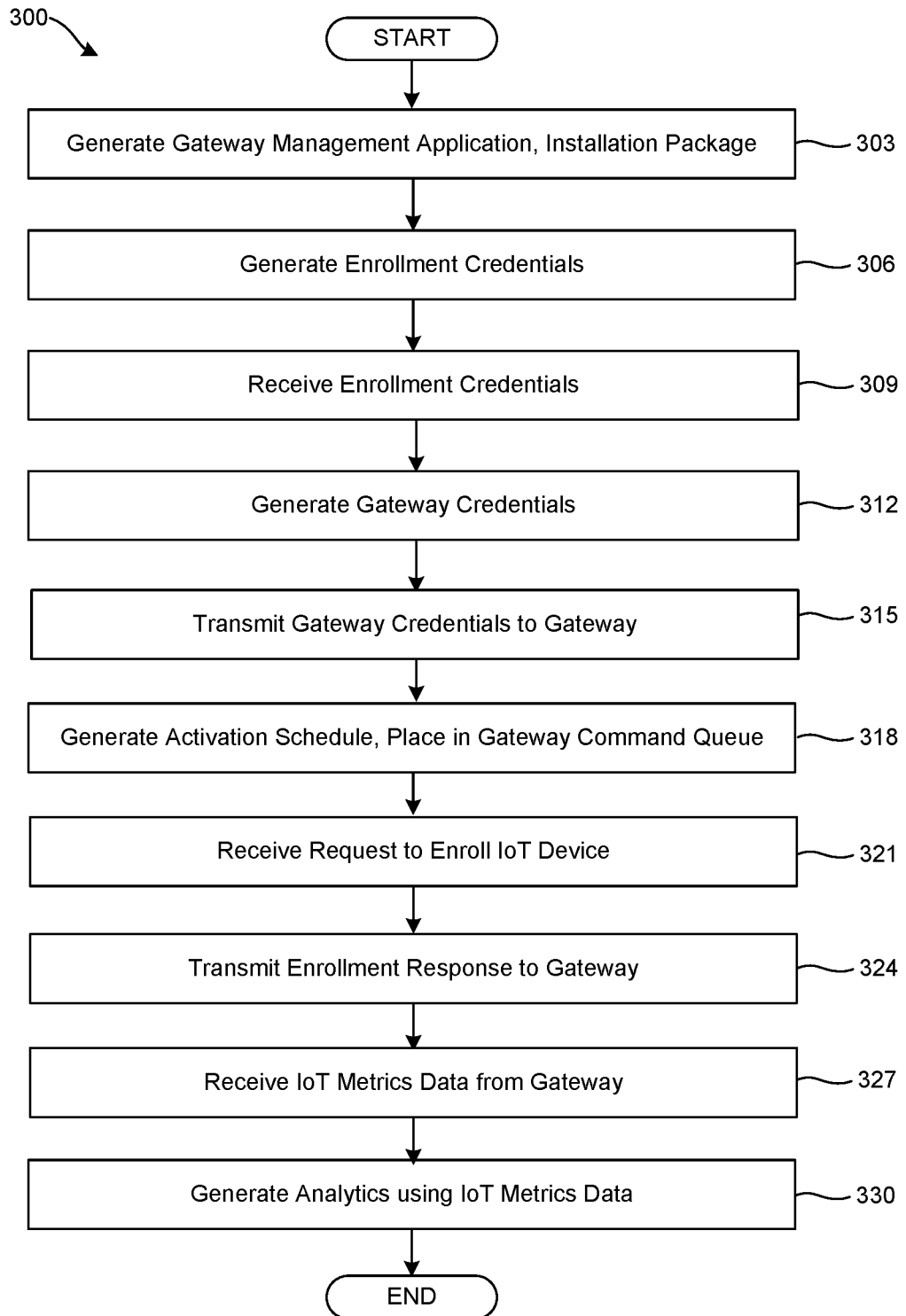
FIGS. 3 and 4 are flowcharts illustrating functionality implemented by components of the networked environment.

FIG. 3 shows a flowchart 300 that illustrates an example of the operation of the management service 120. FIG. 3 illustrates an example of how the management service 120 can be used to perform enrollment of the gateway 111 with the management service 120. The enrollment can also securely provide the gateway 111 with gateway credentials 154 to authenticate the gateway 111 with the management service 120 for IoT device 113 management operations.

In step 303, the management service 120 can generate the gateway management application 187. The gateway management application 187 can be generated to provide a user interface that allows a user such as an administrator or a technician to enter enrollment credentials 151. The enrollment credentials 151 can be entered while installing a side load package or another installation package of the gateway management application 187, or once the gateway management application 187 is installed. A particular version of the gateway management application 187 can be generated for a corresponding type of the gateway 111, for example, so that the type of the gateway 111 can execute the gateway management application 187. The gateway management application 187 can be configured to receive gateway credentials 154 without showing, displaying, or otherwise providing the gateway credentials 154 to the user.

In step 306, the management service 120 can generate the enrollment credentials 151. The enrollment credentials 151 can be limited to operations associated with enrollment of the gateway 111 with the management service 120. In some examples the enrollment credentials 151 can be limited to allowing a connection to an enrollment endpoint provided by the enrollment service 121. The enrollment credentials 151 can be credentials associated with an existing gateway account 149, and can be limited to permitting enrollment operations that include generating gateway credentials 154 for the gateway account 149. In some situations, the enrollment credentials 151 can be used only for generating gateway credentials 154. Alternatively, the enrollment credentials 151 can be used during the enrollment process to create a new gateway account 149, as well as generate gateway credentials 154.

In step 309, the management service 120 can receive the enrollment credentials 151 from the gateway 111. The enrollment credentials 151 can be received from the gateway management application 187, and can be considered a request to enroll the gateway 111 with the management service 120. The management service 120 can establish a secure connection with the gateway management application 187. The secure connection can be secured using a cryptographic protocol such as TLS or another cryptographic protocol. The management service 120 can receive the enrollment credentials 151 from the gateway management application 187 using the secure connection.

In step 312, the management service 120 can generate the gateway credentials 154. The management service 120 can generate gateway credentials 154 across multiple components of the management service 120. The management service 120 can also enroll the gateway 111 with the management service 120 in association with a gateway account 149. The management service 120 can also create the gateway account 149 based on the request. Alternatively, the gateway account 149 can be existing.

The management service 120 can also associate the gateway credentials 154 with the gateway account 149 for authentication with the management service 120 and the IoT Center 123 for management and IoT operations. The gateway credentials 154 can include one or more of a username, a password, or a token for authentication. In some examples, the gateway credentials 154 can include an HMAC token. Tokens including the HMAC token can time limited and can be renewed periodically.

The management service 120 can also identify or assign a unique identifier to the gateway 111. The unique identifier can be provided by a component of the management service 120 that generates analytics, operations statistics, and predictions for monitoring, troubleshooting, cost planning, and configuration of systems managed by the management service 120. In some situations, the management service 120 can receive an initial enrollment request that includes the enrollment credentials 151. The management service 120 can assign and transmit the unique identifier to the gateway management application 187 in response to the request. The management service 120 can receive a second enrollment request to register the gateway 111 that includes an HTTP post to enroll with the management service 120, which can include the unique identifier.

In step 315, the management service 120 can transmit the gateway credentials 154 to the gateway 111. The gateway management application 187 can automatically use the gateway credentials 154 for authentication with the management service 120, without being entered or known by a user. The unique identifier can also be transmitted to the gateway 111. While the administrator, technician, or other user was provided with the enrollment credentials 151 for enrollment of the gateway 111, the gateway credentials 154 are not provided to the user during the enrollment process, and are not shown or displayed by the gateway management application 187.

In step 318, the management service 120 can generate an activation schedule for the IoT device 113. In one example, the management service 120 can receive an activation schedule to enroll IoT devices 113 from a client device 109. Alternatively, the management service 120 can provide a user interface that allows an administrator to create the activation schedule. The user interface can be accessed through a browser application, the management application 177, or another application 175 of the client device 109. Generating the activation schedule can include generating a command that causes one or more IoT devices 113 to be registered or enrolled with the management service 120.

Validation of the IoT devices 113 can be performed by the gateway 111 on behalf of the management service 120. The validation can be performed by checking for a device type and device name associated with each IoT device 113. Once the activation schedule is created, a command to enroll an IoT device 113 can be placed in a command queue associated with the gateway 111. The command can include a configuration file that can be applied or executed by the gateway 111 to enroll the IoT devices 113. The command can include a source URL for the configuration file and a destination where the configuration file should be stored by the gateway 111.

In step 321, the management service 120 can receive a request to enroll the IoT device 113 from the gateway 111. The request to enroll the IoT device 113 with the management service 120 can include a post message transmitted by the gateway management application 187 to the message broker or another component of the management service 120.

In step 324, the management service 120 can transmit an enrollment response to the gateway 111. The enrollment response can cause the gateway 111 to write a file that includes enrollment data for the IoT device 113 in the data store 173. This can allow the gateway 111 to perform validation of the IoT device 113 on behalf of the management service 120. The gateway management application 187 can also cause an IoT management application 197 to be installed on the IoT device 113.

The management service 120 can communicate with the gateway management application 187 to determine whether states exist that do not satisfy one or more compliance rules 141 regarding the IoT devices 113. The gateway management application 187 can receive IoT device 113 communications, for example from the IoT management application 197. The IoT device 113 communications can include status data for the IoT device 113. The gateway management application 187 can pass or otherwise transmit the status data to the management service 120 for evaluation of the compliance rules 141. Alternatively, the gateway 111 can store the compliance rules 141 and can determine or evaluate whether states exist, for example on the IoT devices 113, that do not satisfy one or more compliance rules 141, for example, without passing or transmitting the status data to the management service 120. In any case, determining that states exist in the IoT device 113 that do not satisfy one or more compliance rules 141 can trigger an action or command that causes the IoT device 113 to be in compliance with the compliance rules 141. The gateway management application 187 or the management service 120 can place a command in a command queue for the IoT device 113. The command queue for the IoT device 113 an be stored in the gateway 111 or the management system 106.

In step 327, the management service 120 can receive IoT metrics data 191 for the IoT device 113 from the gateway 111. The IoT metrics data 191 can be generated based on IoT device 113 communications with the gateway 111 and can include a stream of at least one tuple comprising a number and a time stamp. The IoT metrics data 191 can include SI units and a prefix that identifies what the numbers of the stream of IoT metrics data 191 represent.

In step 330, the management service 120 can generate analytics using the IoT metrics data 191. The management service 120 can compute an average number of IoT devices 113 connected to each gateway 111. The management service 120 can also determine an average number of alerts associated with the gateways 111 in a particular time period, for example, per day, week, month, or year. The alerts can be based on security violations, compliance rules 141, power states of the IoT device 113, supply levels of the IoT device 113, or other information describing the state of the IoT device 113. The management service 120 can also determine an average number of alerts associated with IoT devices 113 in a particular time period. The management service 120 can also determine a number of base objects in a total deployment of a managed IoT system, which can include a sum of a number of gateways 111 and a number of IoT devices 113. The management service 120 can also report a number of alerts for all gateways 111 and all connected IoT devices 113. The analytics can be shown in a user interface generated by the IoT center 123, which can be accessed through the management application 177, a browser application, or another application 175 on the client device 109.

Figure 4:
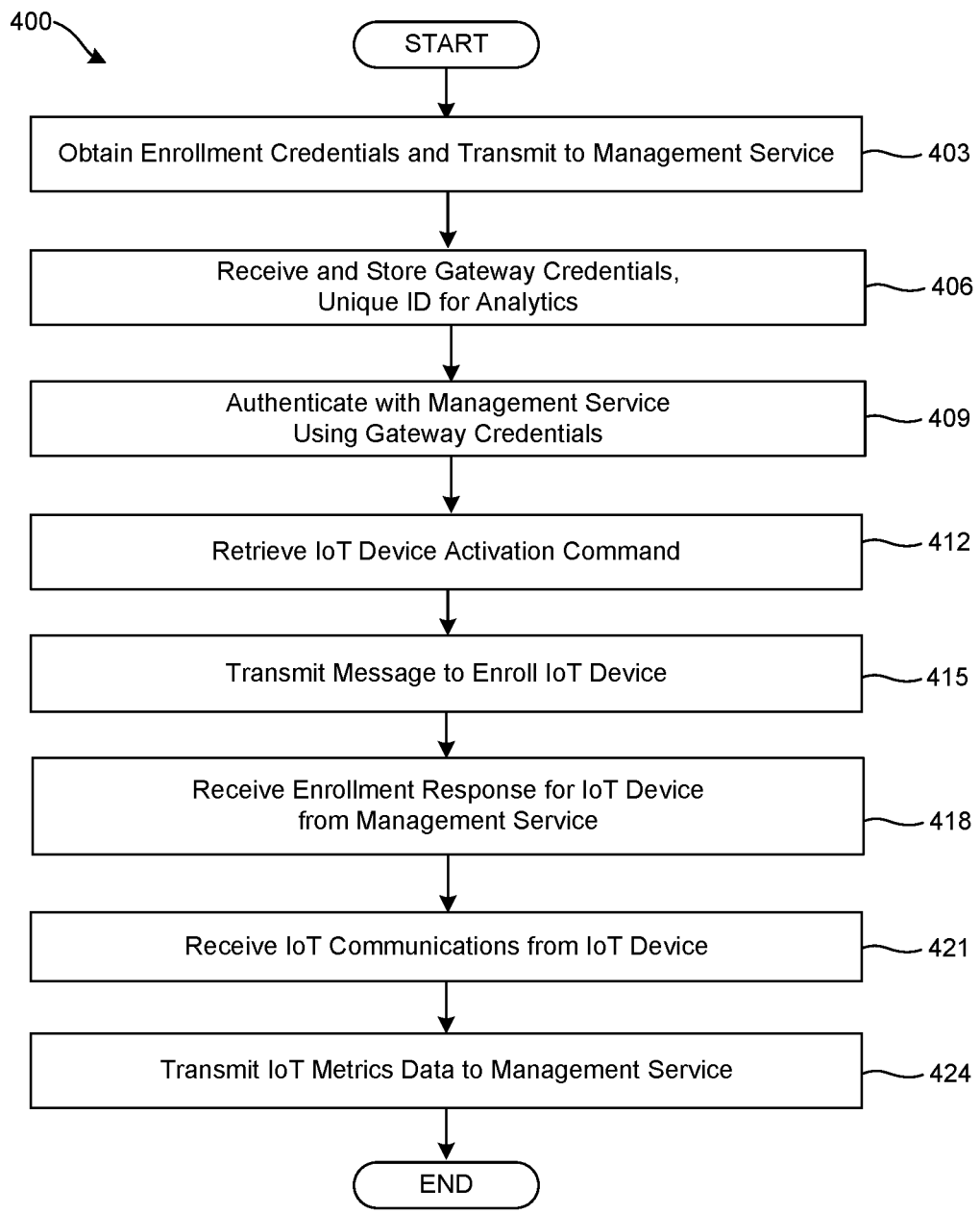

FIG. 4 shows a flowchart 400 that illustrates an example of the operation of the gateway management application 187. FIG. 4 illustrates an example of how the gateway management application 187 can be used to perform enrollment of the gateway 111 with the management service 120. The enrollment can also securely provide the gateway 111 with gateway credentials 154 to authenticate the gateway 111 with the management service 120 for IoT device 113 management operations.

The gateway management application 187 can be installed using a side load package or another installation package, which can be transmitted to the gateway 111 locally or remotely from the client device 109, the management service 120, or from a particular URL provided for download and installation of the gateway management application 187 by the management service 120.

In step 403, the gateway management application 187 can obtain enrollment credentials 151 and transmit the enrollment credentials 151 to the management service 120. For example, the gateway management application 187 can transmit a request to enroll the gateway 111 that includes the enrollment credentials 151 to the management service 120.

The gateway management application 187 can generate a user interface element through which the enrollment credentials 151 can be manually entered by a user. In some instances, the gateway management application 187 does not store the enrollment credentials 151. For example, the gateway management application 187 can allow the entry of the enrollment credentials 151 and transmission to the management service 120, and can discard the enrollment credentials 151 without storing the enrollment credentials 151 in the data store 173.

In step 406, the gateway management application 187 can receive the gateway credentials 154 from the management service 120. The gateway management application 187 can also receive a unique identifier that is assigned to the gateway 111. The gateway management application 187 can store the unique identifier and the gateway credentials 154 in the data store 173. The gateway management application 187 can automatically use the gateway credentials 154 for authentication with the management service 120 without user interaction or intervention. While the administrator, technician, or other user entered the enrollment credentials 151 through the gateway management application 187, the gateway credentials 154 are not provided to the user during the enrollment process, and are not shown or displayed by the gateway management application 187. In some examples, no user is provided with the gateway credentials 154, and they are known only by the management service 120 and the gateway management application 187.

In step 409, the gateway management application 187 can authenticate with the management service 120 using the gateway credentials 154. The gateway management application 187 can transmit the gateway credentials 154 to the management service 120 for management operations associated with the IoT center 123 or the IoT devices 113. For example, gateway management application 187 can transmit the gateway credentials 154 to the management service 120 when checking in with the management service 120 or in order to download an application, product, configuration, or another file from a URL provided by the management service 120. In some cases, the gateway credentials 154 are not provided when checking in.

In step 412, the gateway management application 187 can retrieve a command to activate or enroll an IoT device 113 with the management service 120. The gateway management application 187 can check in with the management service 120 and the command can be retrieved from a command queue associated with the gateway 111. The command can specify a URL to download a configuration file. The gateway management application 187 can use the gateway credentials 154 to authenticate with the management service 120. The gateway management application 187 can download and implement the configuration file.

In step 415, the gateway management application 187 can transmit a request to enroll the IoT device 113 with the management service 120. This can include a post message transmitted by the gateway management application 187 to the message broker or another component of the management service 120.

In step 418, the gateway management application 187 can receive an enrollment response from the management service 120. The enrollment response can indicate that the IoT device 113 is enrolled with the management service 120. The gateway management application 187 can store enrollment data for the IoT device 113 in the data store 173. The enrollment data can include the device name and device type of the IoT device 113, and an enrollment status. The gateway management application 187 can perform validation of the IoT device 113 by checking for the enrollment data in the data store 173. During enrollment of the IoT device 113, the gateway management application 187 can cause an IoT management application 197 to be installed on the IoT device 113. The IoT management application 197 can perform actions as directed by the management service 120 and/or the gateway 111. A command to install a configuration profile to enroll the IoT device 113 can be placed in a command queue for the IoT device 113. The IoT management application 197 can retrieve the command and install the configuration profile to enroll the IoT device 113.

The IoT management application 197 can perform further actions as directed by the management service 120 or the gateway management application 187. The management service 120 or the gateway management application 187 can maintain a command queue for the IoT device 113. The gateway management application 187 can identify status data for the IoT device 113 based on IoT device 113 communications, or receive status data for the IoT device 113 that is identified by the IoT management application 197 or with the gateway 111. The status data can be used to determine whether states exist on the IoT device 113 that violate one or more of the compliance rules 141 based on status data received from the IoT device 113. If the IoT device 113 is not in compliance, the management service 120 or the gateway management application 187 can place a command to bring the IoT device 113 into compliance in a command queue for the IoT device 113 that is maintained by the gateway management application 187 or the management service 120. The IoT management application 197 can retrieve the command to bring the IoT device 113 into compliance. The IoT management application 197 can implement the command. In some examples, the management service 120 can place a command for the IoT device 113 in the command queue for the gateway 111. The gateway management application 187 can retrieve the command, and place it in a command queue for the IoT device 113 that is maintained on the gateway 111.

In step 421, the gateway management application 187 can receive IoT communications from the IoT device 113. The gateway management application 187 can identify a device type and a device name from the IoT communications and validate the IoT device 113 by checking for a device type and device name associated with the IoT device 113 within the enrollment data stored in the data store 173.

In step 424, gateway management application 187 can transmit IoT metrics data 191 to the management service 120. The IoT metrics data 191 can be generated based on the IoT device 113 communications and can include a stream of at least one tuple comprising a number and a time stamp. The IoT metrics data 191 can include a sampling function which is a user defined method (udm), a sampling frequency utilized by the gateway 111 to determine when to send the IoT metrics data 191. For example, IoT metrics data 191 can specify an interval between subsequent executions of the udm and an aggregation count stating how many executions of the udm to aggregate before sending the IoT metrics data 191 to the management service 120 or IoT center 123. The IoT metrics data 191 can include SI units and a prefix that identifies what the numbers of the stream of IoT metrics data 191 represent.

Figure 5:
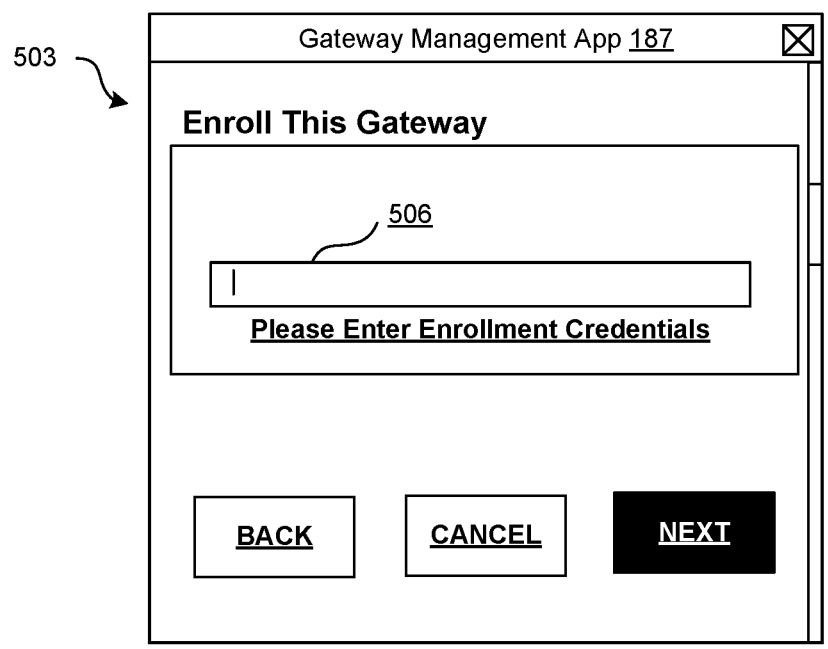
FIGS. 5 and 6 are drawings that illustrate functionality implemented by components of the networked environment and rendered on a display.

FIG. 5 shows an example illustration of a user interface 503 of the gateway management application 187 executed by the gateway 111. The gateway 111 can include a display, and the gateway management application 187 can be rendered on the display. Alternatively, the client device 109 can access the user interface 503 through the network 112, and the user interface 503 can be rendered on a display of the client device 109. The user interface 503 includes a user interface element 506 through which the enrollment credentials 151 can be entered by a user, and a message stating "Please Enter Enrollment Credentials."

Figure 6:
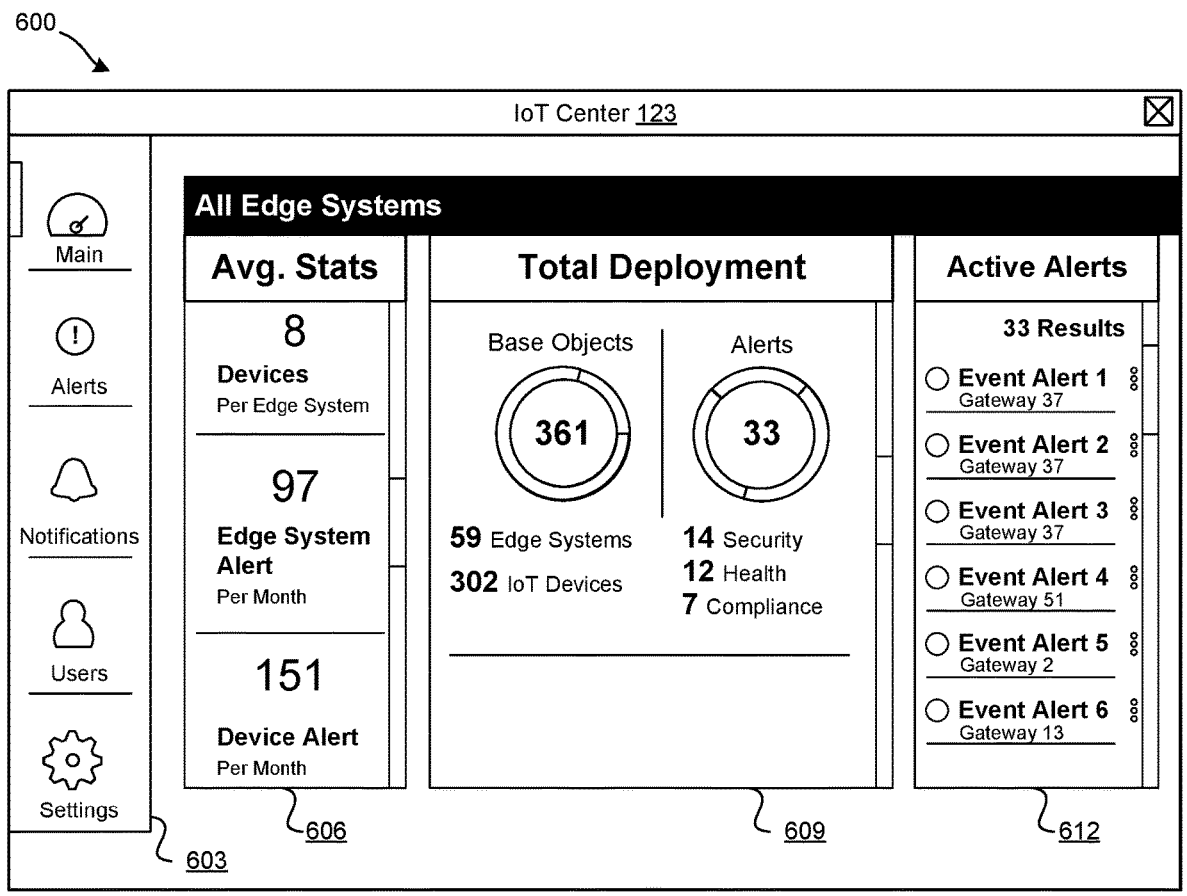

FIG. 6 shows an example illustration of a user interface 600 of the IoT center 123 executed by the management system 106. The management system 106 can include a display, and the user interface 600 can be rendered on the display. Alternatively, the client device 109 can access the user interface 600 through the network 112, and the user interface 600 can be rendered on a display of the client device 109.

The user interface 600 can include a navigation element 603 that includes links to functionalities provided by the IoT Center 123. The user interface 600 can also provide at least one user interface element based on the IoT metrics data 191. For example, a user interface element 606 can show an average number of IoT devices 113 connected to each gateway 111 or other edge device, an average number of alerts associated with the gateways 111 or other edge devices in a particular time period, for example, per hour, day, week, month, or year. The alerts can be based on security violations, compliance rules 141, power states, or other information. The user interface element 606 can also show an average number of alerts associated with IoT devices 113 in a particular time period.

A user interface element 609 can show a number of base objects in a total deployment of a managed IoT system. The number of base objects can be a total number of gateways 111, other edge devices, and IoT devices 113. The user interface element 609 can also report a number of alerts for all gateways 111 and all connected IoT devices 113. A user interface element 612 can show a number of active alerts, and can provide a list of Alerts along with an associated gateway or edge device.

The IoT devices 113, gateways 111, client devices 109, and devices comprising the management system 106 can include at least one processor circuit, for example, having a processor and at least one memory device, both of which couple to a local interface, respectively. The device can include, for example, at least one computer, a mobile device, smartphone, computing device, server device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices comprising the management system 106 can include a display upon which user interfaces can be rendered, including the user interfaces 503 and 600. The IoT devices 113, gateways 111, client devices 109, and devices comprising the management system 106 can also include one or more input/output devices that can include, for example, a capacitive touchscreen or other type of touch input device, fingerprint reader, or keyboard.

Although the management service 120, management application 177, gateway management application 187, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device comprising at least one processor; and
   a data store comprising instructions executable by the at least one processor, wherein the instructions, when executed, cause the computing device to at least:
   receive, by a client device from a management service, a gateway management installation package for a gateway device;
   transmit, by the client device, the gateway management installation package to the gateway device, wherein the gateway management installation package installs a gateway management application to the gateway device;
   using the client device in communication with the gateway device, receive input of enrollment credentials through a user interface generated using at least one application comprising the gateway management application; and
   instruct, using the client device, the gateway management application to perform an enrollment of the gateway device with the management service, the enrollment comprising transmitting the enrollment credentials to the management service to obtain gateway credentials that authenticate communications between the gateway device and the management service, wherein usage of the enrollment credentials prevents a user from being exposed to the gateway credentials.

2. The system of claim 1, wherein the instructions, when executed, cause the computing device to at least:
   transmit, by the client device to the management service, a request for the enrollment credentials.

3. The system of claim 1, wherein the instructions, when executed, cause the computing device to at least:
   receive, by the client device, enrollment credentials for the gateway to enroll with the management service.

4. The system of claim 1, wherein the instructions, when executed, cause the computing device to at least:
   create, through another at least one application comprising the gateway management application, an activation schedule to enroll at least one Internet-of-Things (IoT) device that connects to a network using the gateway device.

5. The system of claim 4, wherein the instructions, when executed, cause the computing device to at least:
   transmit, from the client device to the management service, the activation schedule.

6. The system of claim 4, wherein the activation schedule is implemented using at least one activation command that causes the at least one IoT device to be enrolled with the management service.

7. The system of claim 1, wherein the gateway management application causes the gateway device to automatically use the gateway credentials for authentication with the management service without user interaction.

8. A non-transitory computer-readable medium embodying instructions executable in at least one computing device that, when executed, cause the at least one computing device to at least:
   receive, by a client device from a management service, a gateway management installation package for a gateway device;
   transmit, by the client device, the gateway management installation package to the gateway device, wherein the gateway management installation package installs a gateway management application to the gateway device;

using the client device in communication with the gateway device, receive input of enrollment credentials through a user interface generated using at least one application comprising the gateway management application; and instruct, using the client device, the gateway management application to perform an enrollment of the gateway device with the management service, the enrollment comprising transmitting the enrollment credentials to the management service to obtain gateway credentials that authenticate communications between the gateway device and the management service, wherein usage of the enrollment credentials prevents a user from being exposed to the gateway credentials.

9. The non-transitory computer-readable medium of claim 8, wherein the instructions, when executed, cause the computing device to at least:

transmit, by the client device to the management service, a request for the enrollment credentials.

10. The non-transitory computer-readable medium of claim 8, wherein the instructions, when executed, cause the computing device to at least:

receive, by the client device, enrollment credentials for the gateway to enroll with the management service.

11. The non-transitory computer-readable medium of claim 8, wherein the instructions, when executed, cause the computing device to at least:

create, through another at least one application comprising the gateway management application, an activation schedule to enroll at least one Internet-of-Things (IoT) device that connects to a network using the gateway device.

12. The non-transitory computer-readable medium of claim 11, wherein the instructions, when executed, cause the computing device to at least:

transmit, from the client device to the management service, the activation schedule.

13. The non-transitory computer-readable medium of claim 11, wherein the activation schedule is implemented using at least one activation command that causes the at least one IoT device to be enrolled with the management service.

14. The non-transitory computer-readable medium of claim 8, wherein the gateway management application causes the gateway device to automatically use the gateway credentials for authentication with the management service without user interaction.

15. A method, comprising:

receiving, by a client device from a management service, a gateway management installation package for a gateway device;

transmitting, by the client device, the gateway management installation package to the gateway device, wherein the gateway management installation package installs a gateway management application to the gateway device;

using the client device in communication with the gateway device, receiving input of enrollment credentials through a user interface generated using at least one application comprising the gateway management application; and instructing, using the client device, the gateway management application to perform an enrollment of the gateway device with the management service, the enrollment comprising transmitting the enrollment credentials to the management service to obtain gateway credentials that authenticate communications between the gateway device and the management service, wherein usage of the enrollment credentials prevents a user from being exposed to the gateway credentials.

16. The method of claim 15, further comprising:

transmitting, by the client device to the management service, a request for the enrollment credentials.

17. The method of claim 15, further comprising:

receiving, by the client device, enrollment credentials for the gateway to enroll with the management service.

18. The method of claim 15, further comprising:

creating, through another at least one application comprising the gateway management application, an activation schedule to enroll at least one Internet-of-Things (IoT) device that connects to a network using the gateway device.

19. The method of claim 18, further comprising:

transmitting, from the client device to the management service, the activation schedule.

20. The method of claim 18, wherein the activation schedule is implemented using at least one activation command that causes the at least one IoT device to be enrolled with the management service.

* * * * *